(12) United States Patent
Seiple et al.

(10) Patent No.: US 6,222,484 B1
(45) Date of Patent: Apr. 24, 2001

(54) PERSONAL EMERGENCY LOCATION SYSTEM

(76) Inventors: Ronald L. Seiple, 1063 Koohoo Pl., Kailua, Oahu, HI (US) 96734; Robert B. Seiple, 12319 Calle Albara #3, El Cajon, CA (US) 92017

( * ) Notice: Subject to any disclaimer, the term of this patent is extended or adjusted under 35 U.S.C. 154(b) by 0 days.

(21) Appl. No.: 09/334,859

(22) Filed: Jun. 16, 1999

(51) Int. Cl.[7] .................................................. H04B 7/185
(52) U.S. Cl. ........................................................ 342/357.09
(58) Field of Search ................... 342/357.09; 340/573.6, 340/984; 701/213; 116/210

(56) References Cited

U.S. PATENT DOCUMENTS

| | | | |
|---|---|---|---|
| 4,219,819 | * | 8/1980 | Patel ...................................... 116/210 |
| 5,119,101 | | 6/1992 | Barnard . |
| 5,191,792 | | 3/1993 | Gloor . |
| 5,408,238 | * | 4/1995 | Smith .............................. 342/357.09 |
| 5,420,592 | | 5/1995 | Johnson . |
| 5,552,794 | | 9/1996 | Colley et al. . |
| 5,815,126 | | 9/1998 | Fan et al. . |
| 5,862,511 | | 1/1999 | Croyle . |

OTHER PUBLICATIONS

"Keeping Tabs On Criminals", J. Hosen et al., IEEE Spectrum, Feb. 1995.

"Get A Grip", editor, Boating World, Jun. 1999.

* cited by examiner

*Primary Examiner*—Daniel T. Pihulic
(74) *Attorney, Agent, or Firm*—Leighton K. Chong (57) ABSTRACT

A personal emergency location system (PELS) employs a small battery-powered personal unit worn by a person who may be lost overboard. The personal unit has a GPS receiver and processor for determining the person's GPS location coordinates, and an RF transmitter for sending an RF emergency signal with the GPS coordinate data to a nearby vessel within a short range. The nearby vessel is equipped as a base station to receive the RF emergency signal and the person's GPS coordinate data and send out an RF broadcast signal of the person's position over a long range to the authorities or other rescue vessels. The personal unit is updated with the most current GPS data and recharged during inactive periods when the person on-board a vessel equipped as a base station. The personal unit sends the emergency signal until an acknowledgment signal is received from a base station, whereupon the personal unit is placed in a "Receive-Only" mode to save battery power. The base station is equipped with a GPS system that can be updated with the most current GPS data, so that it can calculate an accurate vector of approach to the person's position. The PELS system handles communications in the preferred GMDSS/DSC signal format (as defined by the International Maritime Organization).

20 Claims, 7 Drawing Sheets

Dormant/Update Flowchart Figure 3.2

PERSONAL EMERGENCY LOCATION SYSTEM

FIELD OF INVENTION

The present invention relates to a system and method for locating a person lost overboard from a vessel. More particularly, the invention concerns a system that is attached to the person at all times while at sea and operates to signal the person's exact location to the vessel or to other rescue vessels.

BACKGROUND OF THE INVENTION

For years persons have been lost overboard and not been able to be located even when near their own ship. Although Emergency Position Indicator Radio Beacons (EPIRBs) have been widely used for decades, they have not been sufficiently small enough to be carried by individuals. Additionally, EPIRBs use radio frequency direction finding and therefore are not very accurate in pin-pointing an individual or even a small boat lost at sea. They are not even very effective for allowing the person's ship to locate the person who has fallen overboard. EPIRBs are typically used by the United States Coast Guard (USCG) service, which continually monitors for EPIRB emergency radio broadcasts and have the ability to determine the location of the EPIRB by Doppler signal processing from the satellite receivers. An EPIRB-determined location is only accurate to within several square miles and can be off as much as thirty square miles.

Other rescue locating devices include mirrors, strobes and lights, whistles flares and other items. These are certainly better than nothing but they are not ideal. In many instances, these devices must be operated by the overboard person who may quickly be overcome and incapacitated by the environment.

More recently, Global Positioning Systems (GPSs) have been used to locate lost persons. GPS systems determine position by receiving signals from a sub-set of the 24 U.S. GPS satellites that are in operation. The signals transmitted by each satellite include a time code, which is synchronized with the time codes transmitted by the other satellites. The GPS system calculates an earth-centered-earth-fixed (ECEF) position for the location where the signals are received, based on the time differences between the signals received from the satellites and the known location of the satellites. ECEF positioning uses a 3-axis coordinate system with the origin located at the center of the earth, and can be translated to a global coordinate-based system (i.e., latitude and longitude).

The GPS satellites are not in geo-synchronous orbits. The location of the satellites are determined from almanac and ephemeris data either downloaded from the ship's host system or from the satellites themselves. Almanac data are good for several weeks and are updated weekly. Ephemeris data are good for about 4 hours and are updated hourly. Almanac data consist of general information regarding all satellites in the constellation and atmospheric data for a determination of RF propagation delays. Almanacs have approximate orbital data parameters for all satellites. The typical ten-parameter almanac describes the satellite orbits over extended periods of time of up to several months and a set for all satellites is sent by each satellite over a period of 12.5 minutes minimally. Signal acquisition time on receiver start-up can be significantly aided by the availability of current almanac and ephemeris data. The approximate orbital data are used to preset the receiver with the approximate position and carrier Doppler frequency (i.e., the frequency shift carried by the rate of change in range to a moving satellite) of each satellite in the constellation. Ephemeris data consist of detailed orbital information for the specific observed satellite. It can take up to 15 minutes to initialize a GPS system if the almanac and ephemeris data are not available or not up to date.

GPS-based locator systems have required individuals to be equipped with a small GPS receiver and a radio to send their latitude and longitude coordinates over the radio. This requires the person to have both devices when lost, which is unusual for most recreational boating situations and typically only occurs with military pilots who are thus equipped. Another approach has been to carry a device that sends an RF emergency signal to the person's vessel or a nearby vessel when overboard, so that the crew on the vessel can broadcast an alert of the overboard situation and give at least the vessel's location with its on-board GPS navigation system when the emergency signal is received. This would provide rescue vessels with the position of the vessel from which the person has fallen overboard, but cannot provide the exact location of the person nor an update of the person's location adrift with the current. A person overboard in heavy sea often cannot be seen even one hundred feet away from a pending rescue vessel. If rescue is not accomplished quickly, that person can easily be lost. Larger ships and sailing vessels typically take time to turn around and retrace their course, so not having an exact location of the overboard person can greatly diminish the effectiveness of the rescue effort. In small sailing vessels often only one person is on watch; if that person falls overboard, it may be hours before it becomes known.

SUMMARY OF THE INVENTION

In accordance with the present invention, a personal emergency location system (PELS) comprises a small battery-powered personal unit adapted to be worn by a person who may have fallen overboard from a vessel having a GPS receiver and processor for determining the person's GPS location coordinates, and an RF transmitter for sending an RF emergency signal of the person's coordinate data to a nearby vessel (such as the person's vessel) within a short range. The PELS personal unit is updated with the most current ephemeris data during a time when the person is inactive on-board the vessel by plugging it into an input module connected with the vessel's GPS system. The person wears the PELS personal unit when on active duty on the vessel. If the person falls overboard, the PELS personal unit is activated to send an emergency signal with the person's location coordinates. The person's vessel or a nearby vessel within a short range can receive the PELS emergency signal, provide a distress acknowledgment, mark the position of the person based on the received emergency signal, and broadcast an alert and emergency signal to other rescue vessels or stations of the person's position.

In a preferred embodiment of the present invention, the PELS personal unit includes a ROM memory for storing a GPS calculation program of machine-readable instructions in order to determine the person's GPS location coordinates to be sent via radio frequency to a nearby GPS-equipped vessel. The RF signal is preferably formatted as a digitized data packet transmitted at 156.525 MHz, meeting all International Maritime Organization (IMO) specifications for digital emergency radio communications.

The PELS system also requires a GPS-based system on-board the person's vessel or a nearby vessel (referred to as the "base station") that is able to receive the distress signal from the PELS personal unit and provide a distress acknowledgment to it. The base station translates the received personal unit's GPS position into its own navigation program and calculates an intercept vector (range and bearing) to the individual or plots the location of the individual on an electronic chart. The base station can have an emergency communications system which will receive the distress signal and alert the operator with the overboard person's positional information. The base station can perform a "Distress Relay" to other appropriate authorities (as defined by the IMO). Upon receipt of the "Distress Acknowledgment", the personal unit will enter a standby mode to preserve battery power and enable an acknowledgment-received indication for the distressed individual. This can be done by use of an indicator light(s), audible signal or vibration. The lost person thus knows by the indicator that his distress signal has been received.

The present invention also encompasses the related method for determining the exact location of lost persons equipped with a PELS personal unit, whether on ocean or land.

BRIEF DESCRIPTION OF THE DRAWINGS

The features, objects and advantages of the invention will be described in detail below in conjunction with the accompanying drawings, in which like reference numerals designate like parts throughout, wherein:

FIGS. 3.1, 3.2, 3.3, 3.4, and 3.5 are flowcharts illustrating the sequence of steps performed by the main program and subroutines used to operate the PELS system.

DETAILED DESCRIPTION OF THE INVENTION

Figure 1:
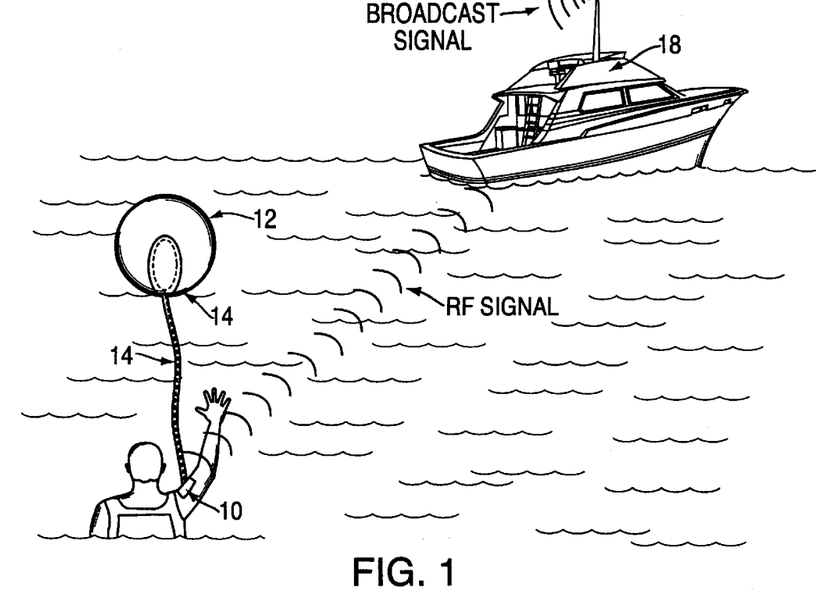
FIG. 1 is a diagram of use of the personal emergency location system (PELS) including the personally-worn device and the base station in accordance with the invention.

Referring to FIG. 1, a personal emergency location system (PELS) in accordance with the present invention employs a small, battery-powered personal unit 10 worn by a person fallen overboard, and a GPS-equipped transceiver system 18 on board the person's vessel or any thus-equipped nearby vessel. Once overboard the person activates the personal unit 10 to initialize its GPS receiver. Preferably, activation will also inflate and deploy a balloon 12 which holds an antenna 14 for the personal unit above the water. The antenna may be carried within a plastic sleeve line and on the inside of the balloon. The balloon may also be dyed a fluorescent color to serve as a visual marker to rescue personnel.

The personal unit's GPS receiver receives the available GPS satellite transmission signals and its processor determines the person's GPS location coordinates. The PELS personal unit will start emitting its initial "Distress Call" transmission(s) after activation. The unit's RF transmitter sends an RF emergency signal with the GPS location data over a short range (line of sight) from the battery-powered unit. Depending on the transmitter power level chosen, and the placement (height) of the antenna, this short range can be anywhere from 3 to 15 or 20 miles. The person's vessel or a nearby vessel within the short range (the "base station") can receive the RF emergency signal and send a broadcast signal over a longer range and at higher power to other rescue vessels, emergency communications stations, such as a USCG station, or even to a satellite receiver for relay.

In a preferred embodiment of the invention, the base station (vessel) is equipped with a GPS system and a Global Maritime Distress and Safety System (GMDSS) radio, which is defined by the International Maritime Organization (IMO) and the United States Coast Guard (USCG) as the next generation of maritime radio communications. GMDSS defines the use of maritime radio systems and specifically defines the digitized distress signaling capability of standardized maritime systems, called Digital Selective Calling (DSC). DSC is implemented on each radio frequency band (MF, HF, and VHF) as a single channel for transmitting and receiving digitized data concerning general broadcasts and distress signals. DSC-equipped radios are classified as to their frequency band of operation and their inherent capability. The classifications are listed as Class A–G.

The preferred PELS system uses GMDSS channel 70 for marine applications. Channel 70/DSC is the new international emergency frequency and will be required by all Safety Of Life At Sea (SOLAS) ships by the year 2000. Channel 70 operates in the VHF band at 156.525 MHz and will be monitored by all vessels carrying GMDSS/DCS. This includes all international rescue agencies and all (SOLAS) regulated vessels engaged on international voyages, except: cargo ships less than 300 gross tonnage; ships of war and troopships; ships not propelled by mechanical means; wooden ships of primitive build; pleasure yachts not engaged in trade; fishing vessels; and ships being navigated within the Great Lakes of North America. However, it is generally assumed that most commercial and recreational boaters that do not fall under the SOLAS regulations will also choose GMDSS radio equipment to maintain compatibility and utilize the installed base of radio equipment, thereby providing the PELS system with a broad base of potential rescuers.

The basic operation of this invention is simple but requires a unique combination of GPS reception, radio transmission and reception, power management, and antenna design. The core of the system is the small personal unit worn by individuals. Once activated, the small personal unit calculates its position using a GPS receiver and sends that position by RF to a base station. For marine applications, the RF signal uses the GMDSS/DSC frequency of 156.525 MHz. This signal is sent in a digitally coded data packet format as specified by the IMO to meet all GMDSS/DSC requirements. It sends these bursts at specific time intervals with a decreasing repetition rate calculated to optimize the trade-off between operational life-span and limited battery capacity.

Once the personal unit's signal is received by a base station, the base station translates that signal into a GPS location and the individual's ID code. The ID code will identify the signal to a specific individual and ship. For rescue operations this is extremely important as it will reduce false alerts to a minimum by allowing rescue operations to determine if the situation is real or not. Once the base station receives the information, it sends a DSC "Acknowledgment Signal" to the personal unit. When the personal unit has received the acknowledgment signal, it goes into a receive-only mode (RPD mode). The base station or any other base station can re-activate the personal unit at any time, or it can be commanded by the individual wearing the unit. In the later case, if a new aircraft or surface vessel comes nearby, the personal unit may be turned on to notify that new vessel. Upon receiving a DSC "Individual Station Call" with its own ID code as the intended recipient, the PELS personal unit will begin retransmitting its "Distress Call" until another "Distress Acknowledgment" signal is received, whereupon it goes back into RPD mode. This technique saves on battery power for the personal unit. Since any base station can command an updated position of the personal unit, any GMDSS/DSC equipped ship, or aircraft could determine the position and effect a safe recovery.

The PELS personal unit can thus provide GPS signals of the person's exact location to the base station using DSC radio signals. Unlike other current systems that use RF/DF to locate someone, this system provides the more accurate GPS-calculated position of latitude and longitude in tenth of seconds. The base station then uses the lat/long information to determine the exact position of the distressed individual, which can be displayed electronically on a chart or map, or provided in vector format (bearing and distance from the rescuing platform's current position) to effect a recovery. The personal unit must be able to receive GPS and DSC frequencies at all times. This is accomplished by using a specially protected antennae that can operate in a wet environment (e.g., sheathed in a balloon). The personal unit can be activated either automatically (e.g., by an immersion sensor) when it becomes wet, or manually by the person. The personal unit can be re-activated by the lost person at anytime even when placed in the RPD mode by the base station.

The PELS personal unit is preferably configured for classification of DSC Class F devices, which operate on VHF band, but cannot make an individual or routine call, and does not require a display. Class F required capabilities include:

Distress call

All-ships call

Use of distress, urgency, and safety priorities

Distress coordinates

Time for last (distress) position update

Receive individual station call

Receive acknowledgment of its own distress calls

Since the PELS personal unit's transmission is based on the standard GMDSS/DSC protocol, all GMDSS/DSC radios can receive the distress call and its associated positional information. This will provide the distressed individual the widest possible dissemination of the radio distress signal, allowing any and all DSC radio equipped vessels to receive and process the distress signal and assist in the rescue operation.

The PELS base station is preferably configured to DSC requirements for Class B devices. Class B devices operate via VHF and MF radios used by SOLAS-regulated ships, and required capabilities include:

Distress call

All-ships call

Individual station call

Semi-automatic/automatic service call

Use of distress, urgency, safety and routine priorities

Nature of distress

Distress coordinates

Time for last (distress) position update

Type of subsequent communications

Distress relay

Distress acknowledgment

Test call (for MF/HF only)

Radio frequency or channel

Display

Receive geographical area calls

Alarm

Optional means for canceling a distress alert

Figure 2A:
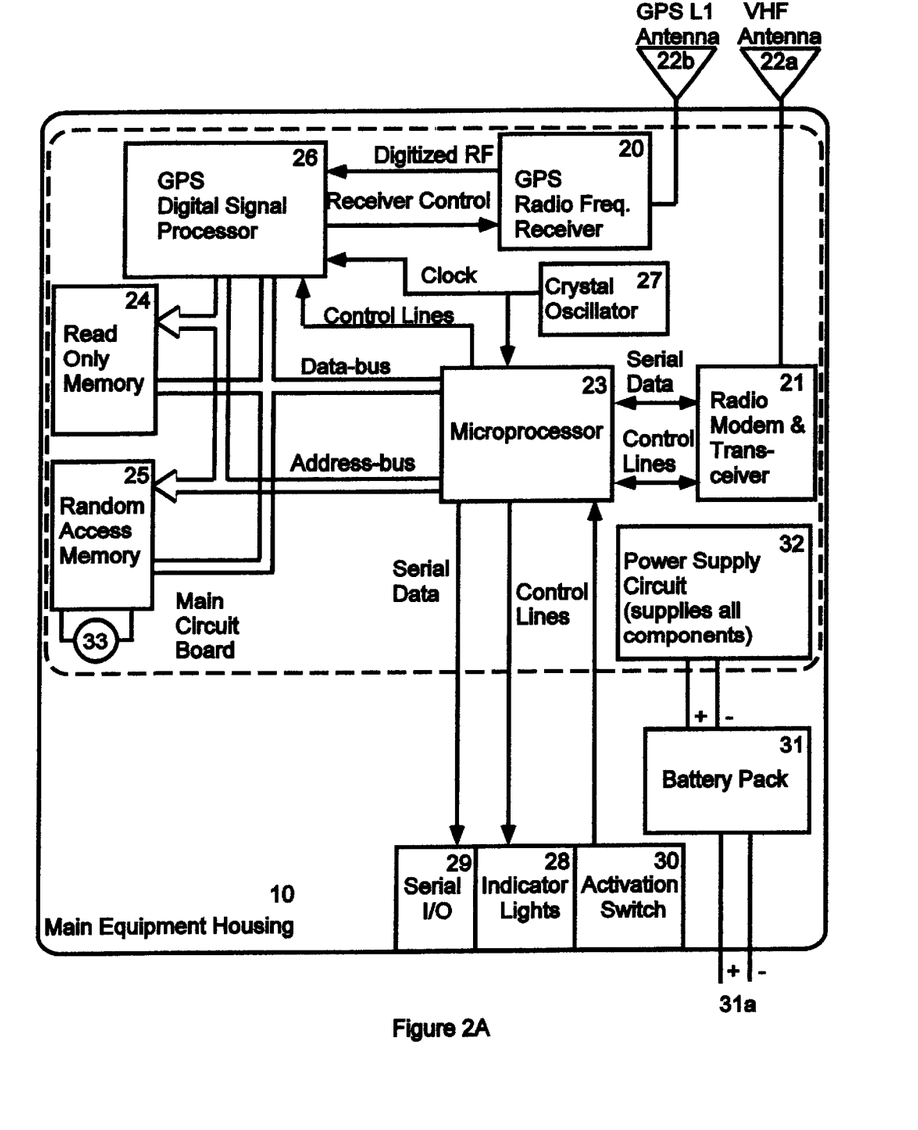
FIG. 2A is a diagram showing the components of an embodiment of the personal PELS unit.

In FIG. 2A, a preferred circuit implementation for the PELS personal unit 10 is illustrated. The principal components of the PELS personal unit are a GPS receiver 20, an integrated DSC/RF transceiver 21, antennae 22a for DCS reception and transmission and 22b for GPS reception which are external to the personal unit's housing (as shown in the outer solid line), microprocessor 23, ROM memory 24, RAM memory 25, and a GPS processor 26. The GPS processor 26 and unit microprocessor 23 may be formed as separate IC units, or as a single IC. The GPS receiver 20 is typically a specialized front-end multi-channel radio frequency receiver IC. The GPS receiver 20 outputs data used to determine ECEF fixes to the GPS processor 26. The microprocessor 23 performs the final GPS fix calculation and also handles the PELS control functions. An example of a preferred microprocessor is a Motorola 6800 series microprocessor such as the 68331, but equivalent devices from other manufacturers are also usable. Examples of GPS chip sets including a GPS receiver IC and companion GPS-DSP IC that are suitable for use in the PELS system are the 'Sierra' chip set available from Trimble, Inc., Sunnyvale, Calif., the 'Sirfstar' chip set available from Sirf Technology, Inc., Sunnyvale, Calif., or similar chip sets available from Garmin Inc., Olathe, Kans.

The PELS personal unit also includes a crystal oscillator circuit 27 that provides clock and local oscillator signals to the GPS processor 26, GPS receiver 20, and microprocessor 23. The clock circuits may also contain a Real Time Clock to maintain the time standard while in sleep or power-down modes. Standard computer read-only-memory (ROM) 24 is used to permanently store the PELS software requirements. Standard random access memory (RAM) 25 is used to temporarily store ephemeris data, almanac data, and other operands.

To save on bulk and weight, the PELS personal unit is shown without a data display. Instead, it can have indicator lights 28 to show its operational status. The indicator lights can have multiple modes to alert the user to the following conditions: (1) activated—all systems are on, activation has occurred and distress signals are being sent; (2) acknowledged—distress signals have been sent and acknowledgment has been received, and the RPD mode is set; (3) minor fault—for example, the almanac data has expired so the GPS will take longer to process a fix, or the main battery pack has discharged to below 80%, etc.; and (4) major fault—the unit is not functioning properly. A data display may be an option for certain applications in which the system is being used for informational purposes, such as by hikers and explorers.

The PELS personal unit also has a serial interface port 29 for data exchange when connected (on-board) with the base station GPS system (described below). Activation switch(es) 30 is provided to give the user manual input capability, for example, to activate the unit and initialize the distress sequence, to exit the 'RPD' mode (re-send the distress signal manually), and/or to cancel the distress sequence.

A number of data busses interconnect the components of the PELS personal unit. The ROM 24 and RAM 25 are in data communication with the GPS processor 26 and the microprocessor 23. The GPS processor 26 is in data communication with the GPS receiver 20, the microprocessor 23, and the ROM 24 and RAM 25 circuits. The microprocessor 23 is in communications with the GPS processor 26, ROM 24, RAM 25, and the RF transceiver 21. The microprocessor is also in communications with the following external components: serial data interface 30, indicator lights 29, and activation switch(es) 30. Address busses also connect the microprocessor 23 and GPS processor 26 to the ROM and the RAM. The GPS processor 26 controls the GPS receiver 20 through receiver control lines.

The PELS antenna 22b receives radio frequency (RF) signals from GPS satellites on their L1 transmission frequency, and the antenna 22a is for reception/transmission of GMDSS/DSC radio signals at 156.525 MHz (Channel 70). The GPS satellite signals are input to the GPS receiver 20 and the DSC/RF signals are passed to/from the radio transceiver circuit 21. Antenna design and placement is important for signal reception and transmission. The radio circuit design will include both transmitter and receiver circuits for sending/receiving a digitized transmission.

The PELS personal unit power supply includes a main battery 31 and a backup battery 33. The main battery supplies power to the power supply circuitry 32, which converts and regulates the voltage as appropriate for the PELS operational circuitry. The main battery pack preferably comprises rechargeable or secondary batteries and can be nickel-metal-hydride, lithium or other similar high-density commercially available battery. An external plug or jack 31 a is provided to allow a recharger line to be connected to the main battery pack 31. The main pack needs to provide power to the system for up to 5 minutes of transmit time and 3 days of receive time plus GPS reception and calculations. Transmit time of 5 minutes translates to up to 600 separate transmissions of encoded digital data. The backup battery 33 provides power to the RAM which maintains the GPS almanac, ephemeris data and current fixes. The backup battery can be a very small lithium coin-cell battery or similar battery.

This invention includes several important power conservation features which allow the device to be made small enough to be worn by an individual. These features include the GPS receiver IC and the GPS processor IC being placed in the standby mode or sleep mode between the times that the signals are received from the GPS satellites to obtain a fix. Power is conserved by reducing the clock rate of the microprocessor during periods of GPS shutdown. The microprocessor is operated at its full clock rate only while performing calculations related to obtaining a GPS fix. The operating speed of the microprocessor is varied by changing the frequency of the programmable Phase Lock Loop (PLL) that provides the clock input to the microprocessor. Alternatively, some models of microprocessor have internal systems for clock speed modulation. DSC transmissions are repeated at decreasing time intervals until a "Received Acknowledgment" signal is registered, then the DSC transmitter is placed into sleep mode until either an "Update Request" is received via DSC or the user re-activates the distress switch. Reduction in power consumption permits less battery volume, which results in a smaller overall size and weight of the PELS personal unit.

Satellite reception time for receiving signals for a GPS fix can be reduced to an absolute minimum by maintaining up-to-date almanac and ephemeris data. The worst case for an initial GPS fix by the personal unit would be approximately 3–4 minutes (no valid ephemeris, or almanac data present). Once the initial fix is acquired, the GPS reception and calculation portion can be shut down until another fix is required by the base station or at prescribed longer intervals such as every ten minutes. The re-acquisition GPS fix time should be very short (less than 15 seconds) since the ephemeris and almanac data are already stored in memory.

The PELS personal unit can be attached to the person's belt or shoulder or held in a pocket. However, to system's antennas must be held out of the water. This can be done by holding the system up, attaching it to a hat, attaching it to the collar of a life jacket, or by the use of a small inflatable balloon holding the antennas aloft (as shown in FIG. 1). For this purpose, a balloon on a tether mounting the antennae can be inflated by a helium capsule and released upon activation. The balloon, for example, would not need to be larger than 18 inches in diameter to support antennae of the contemplated size. The balloon could also serve as a better visual target and/or as an additional flotation device when at sea.

Figure 2B:
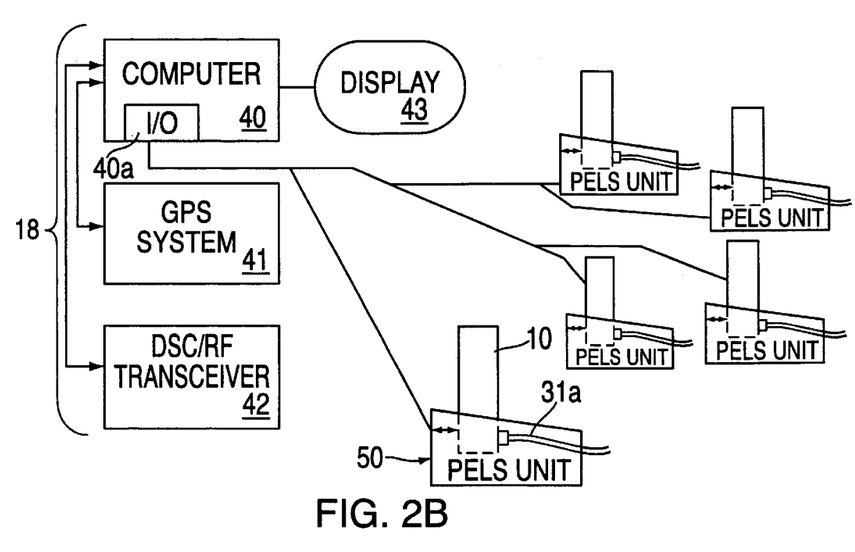
FIG. 2B is a diagram illustrating the components of the base station.

In FIG. 2B, the base station 18 includes a GPS system 40, a computer 41, and a DSC/RF transceiver 42. The base station is essentially a computer terminal coupled with a GPS system and a DSC radio transmitter and receiver station. The base station can be a stand-alone system or interfaced into an existing computer package using PELS software. Existing GPS units can be adapted to this system. It is desirable to have a computer with output video display to provide a chart or map position of the lost person. This can be done by connecting a laptop computer, or the components can be integrated in a PELS base station system. The computer 41 can be used to interface to computerized chart display software or systems and shipboard automatic piloting systems.

The GPS ephemeris data can be kept precise with updates every 4 hours. If the ephemeris data are older than four hours, the first GPS fix can take up to 5 minutes to obtain. The personal unit can update the ephemeris data in two ways. The first method is to download the data from the base station during sleep periods while recharging the batteries. The second method is to update the personal unit with its GPS receiver whenever the GPS signals are available for reception.

The on-board GPS system of the base station can be configured with the ability to transfer GPS almanac and current ephemeris data to the individual PELS units during sleep periods via a serial interface circuit 40a. The serial interface circuit 40a is connected to separate recharge modules 50 to which the PELS units are connected during inactive periods for data transfer and recharging the main battery. When connected with the on-board GPS system, each personal unit can download the GPS updated almanac and current ephemeris data and perform functional tests. In addition, the main battery pack is recharged if it has dropped to the 80% power remaining level. Since the system does not become fully operational while on board the ship, recharging can take some time. The module 50 can be configured as a remote unit into which the personal unit is plugged or inserted in its "night stand" when the user is asleep. The personal unit can thus be recharged to 100% level and updated with ephemeris, almanac, position and time data on a daily basis.

Besides managing the GPS system with navigation/mapping package and the DSC/RF transceiver, the base station can have automatic alert and transmission functions for automatically displaying an alert and sending a broadcast signal when an emergency signal is received from a personal unit. The alert software can have an automatic alarm function that comes on and provides an audible signal. The base station can be set up to automatically monitor channel 70 on DSC. This DSC channel will be monitored at all times like 121.7 or channel 16 is currently monitored. When a DSC distress signal is received from a PELS personal unit, the base station's DSC radio will recognize the signal as an emergency and the pertinent data is recorded on the system computer. The software then determines the position and the ID of the personal unit, initializes the alert, and sends out an acknowledgment message to the personal unit. The personal unit is then switched into the RPD mode. If the RPD mode is not activated the base station will quickly know because the personal PELS will keep responding until it is placed in the RPD mode. Once the system is in the RPD mode any vessel equipped with a PELS base station can request an updated position by sending a predetermined signal to the personal unit, such as the standard GMDSS/DSC "Individual Station Call". When the "Individual Station Call" is received by the personal unit, it is re-activated to update its GPS position and retransmit the DSC distress signal. It continues to transmit the update until it receives an acknowledgment signal, whereupon it returns to the RPD mode. This process continues until a rescue is accomplished.

If the PELS personal unit remains in the RPD mode longer than a preset amount of time, and the unit is not de-activated or has not received an "Individual Station Call", the PELS personal unit can be programmed to automatically retransmit the "Distress Call". This feature may be useful in conditions where the person in distress is unconscious or disabled.

The PELS system may be used to send an emergency alert directly or indirectly to a satellite receiver. With sufficient battery power and antenna range, the PELS personal unit can be used to send a signal directly to a satellite receiver in the same way as a base station alert, or indirectly via a nearby base station. For example, the PELS system could send an alert to a global satellite telecommunications system, such as maintained by the Iridum Satellite Consortium. Similarly, a signal relayed by satellite could be used to signal the PELS personal unit or to signal a nearby base station to signal the PELS personal unit. The satellite system can be used as a relay to send out an alert over the DSC network or otherwise to alert vessels within the vicinity. By tying into a global satellite relay system, the PELS system can be used anywhere on land or sea, although it would require a higher cost and higher demands for system capability.

Figure 31:
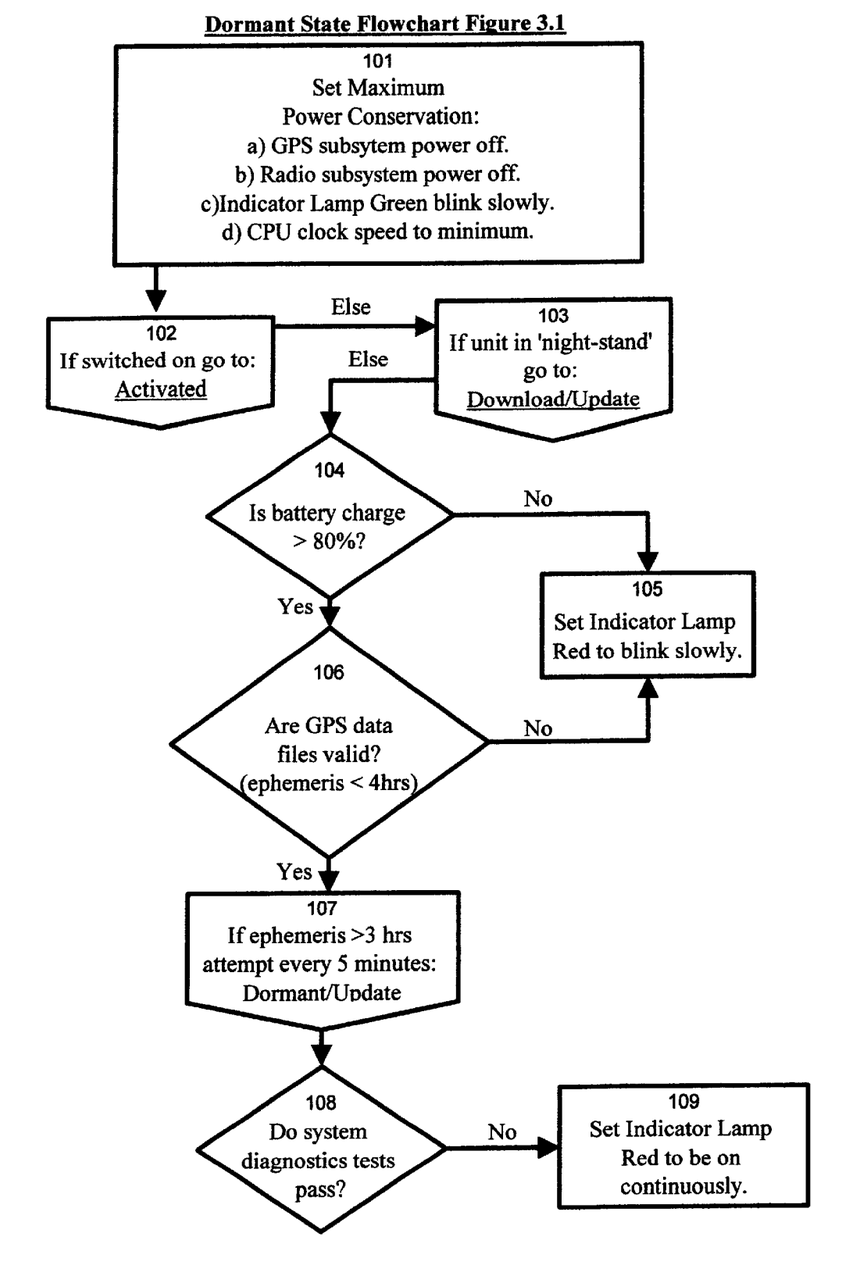

The preferred modes of operation of the PELS system will now be described. Referring to the flowchart in FIG. 3.1, the personal unit in the dormant state (block 101) has the GPS subsystem power off, the radio subsystem power off, its Minor Fault (green) indicator light blinking slowly, and the CPU clock speed set to minimum. If switched on (block 102), the personal unit goes to its Activation Procedure. If the unit is inserted in its night stand (block 103), it goes to its Download/Update Procedure. Otherwise, the unit monitors if the battery charge is below 80% (block 104), and if so, sets its Major Fault (red) indicator light to blink slowly (block 105) to inform the user that the unit needs to be recharged in its night stand. The unit also monitors if the ephemeris data have not been updated for more than 4 hours (block 106), and if so, attempts to go to its Dormant/Update Procedure (block 107). The unit also monitors if it passes its diagnostic tests (block 108), and if not, sets its Major Fault (red) indicator light to be on continuously.

Figure 32:
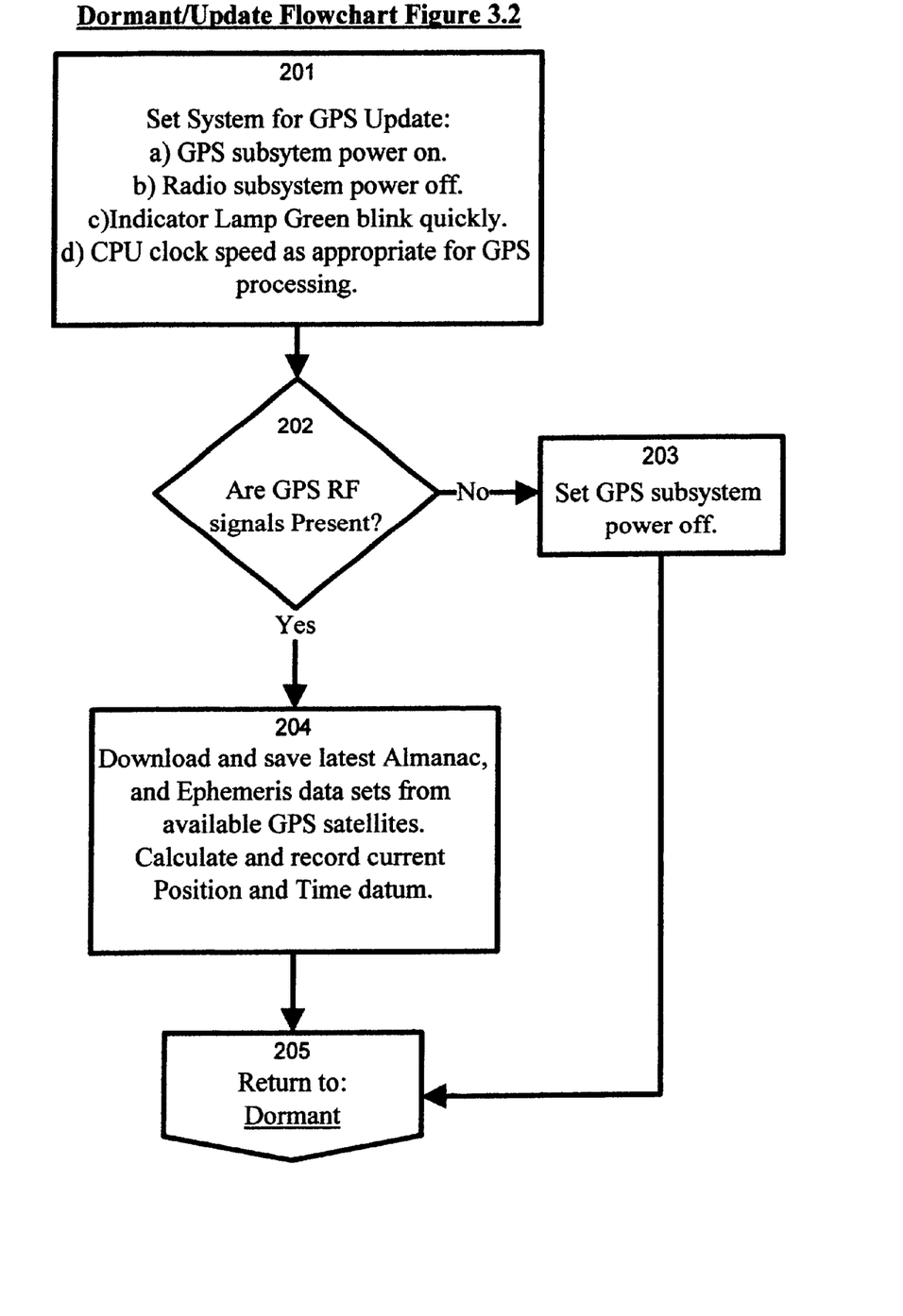

Referring to the flowchart in FIG. 3.2, the personal unit in its Dormant/Update Procedure (block 201) has the GPS subsystem power off, the radio subsystem power off, the Minor Fault (green) indicator light blinking quickly, and the CPU clock speed set for GPS processing. If GPS signals are input (block 202), the personal unit downloads the latest almanac and ephemeris data from the available GPS satellite transmission signals and records the current position and time data (block 204). If not, the GPS subsystem is shut off (block 203), and the unit returns to the Dormant state (block 205).

Figure 33:
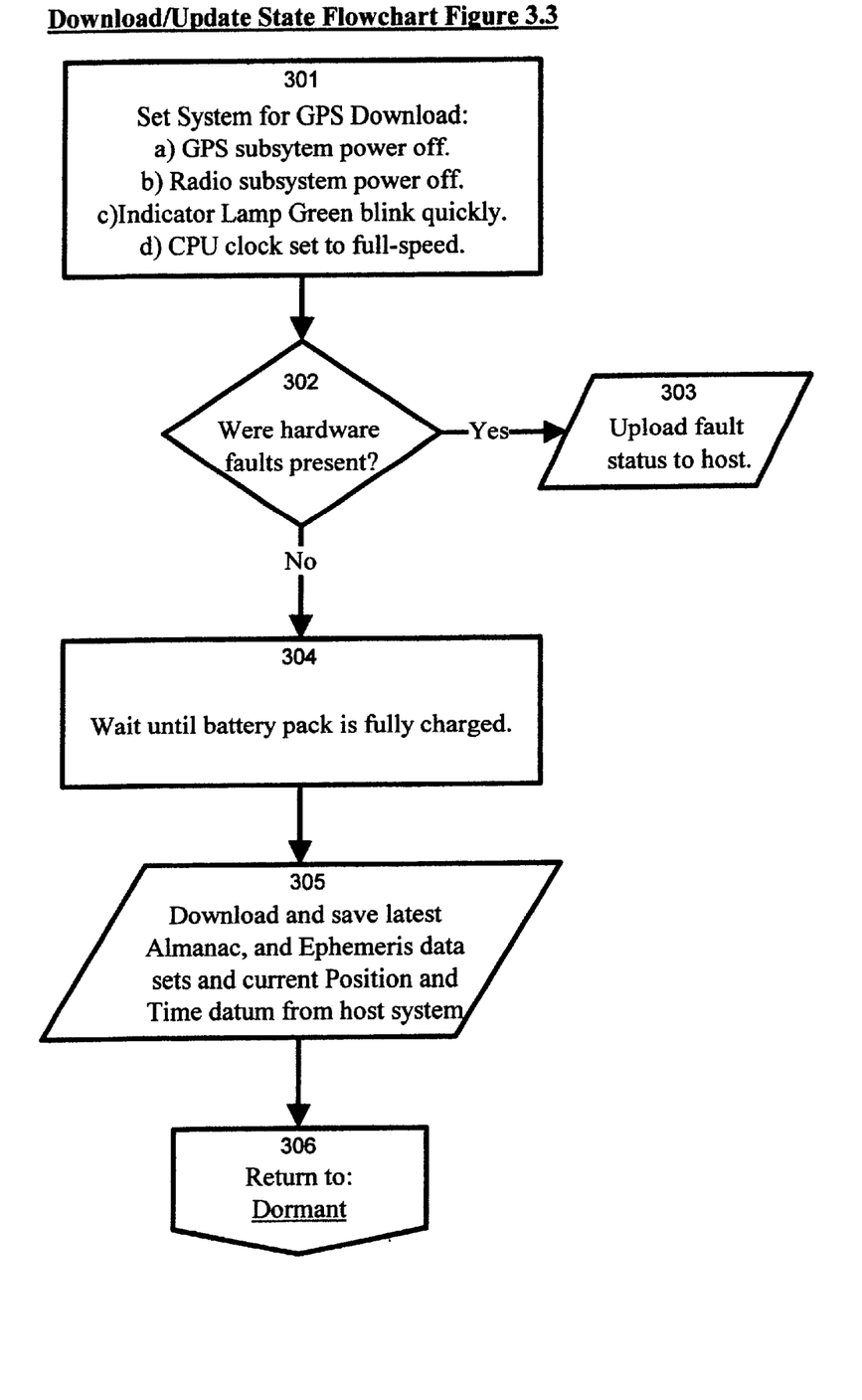

Referring to the flowchart in FIG. 3.3, the personal unit in its Download/Update Procedure (block 301) has the GPS subsystem power off, the radio subsystem power off, the Minor Fault indicator light blinking quickly, and the CPU clock speed set to full speed. If hardware faults are detected (block 302), the personal unit uploads its fault status to the host base station (block 303). If not, it tests whether the battery pack has been fully charged (block 304), and also downloads the latest almanac and ephemeris data and records the current position and time data (block 305). The unit then returns to the Dormant state (block 306).

Figure 34:
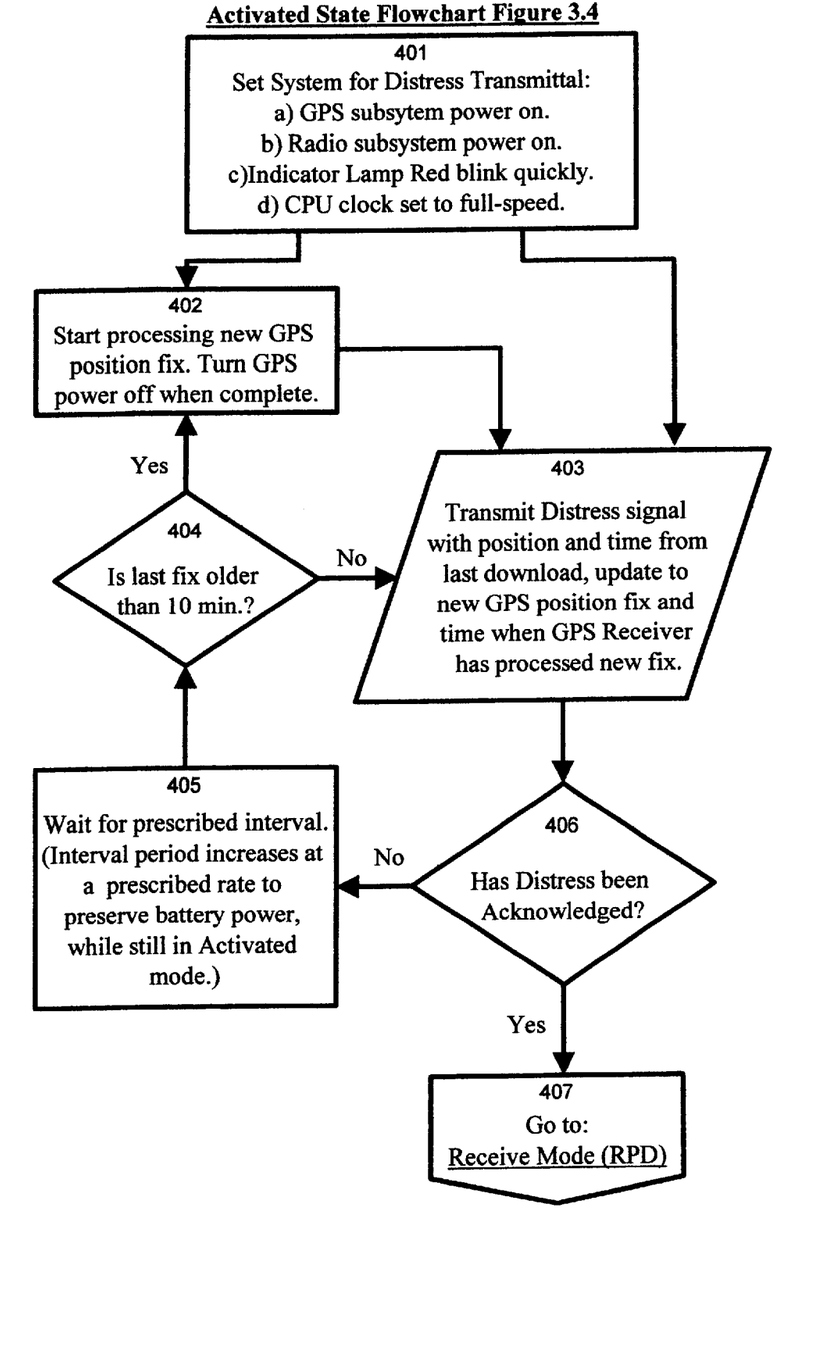

Referring to the flowchart in FIG. 3.4, the personal unit in its Activated State (block 401) has the GPS subsystem power on, the radio subsystem power on, the Major Fault indicator light blinking quickly, and the CPU clock speed set to full speed. The unit then starts processing a new GPS position fix (block 402). Upon completion, it transmits a distress signal of the last position it recorded, the update to the new GPS position fix, and current time (block 403). It then checks whether its distress signal has been acknowledged (block 406), and if so, turns to the Receive-Only (RPD) Mode (block 407). If its distress signal has not been acknowledged, it clocks a prescribed increasing time interval (block 405), and if the last fix is older than 10 minutes, it returns to start processing a new GPS position fix (block 402).

Figure 35:
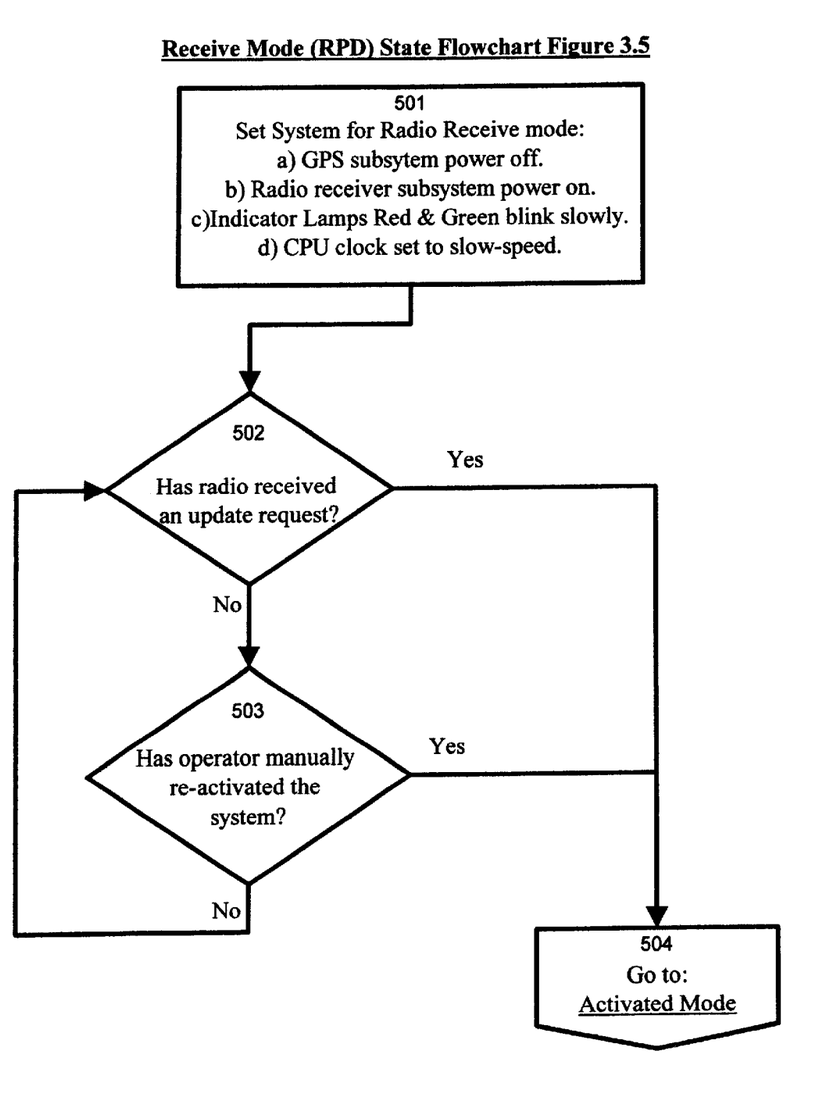

Referring to the flowchart in FIG. 3.5, the personal unit in its Receive-Only (RPD) Mode (block 501) has the GPS subsystem power off, the radio subsystem power on, both Major and Minor Fault indicator lights blinking quickly, and the CPU clock speed set to slow speed. The unit checks if it has received an Update Request (block 502), and also if the manual activation switch has been activated (block 503). If either is yes, it goes to its Activated State.

It is to be understood that many modifications and variations may be devised given the above description of the principles of the invention. It is intended that all such modifications and variations be considered as within the spirit and scope of this invention, as defined in the following claims.

What is claimed is:

1. A personal emergency location system comprising: a small, personal unit adapted to be worn by a person and having a GPS antenna for reception of GPS satellite signals, a GPS receiver for handling the GPS satellite signals, a GPS processor for determining GPS location coordinates from the received GPS satellite signals, an RF transmitter for generating an RF emergency signal with the determined GPS location coordinates, and an RF antenna for transmitting the RF emergency signal generated by the RF transmitter within a predetermined short range to any nearby entity having an RF transceiver which can receive the short-range RF emergency signal and send an acknowledgment signal to the personal unit, and wherein the personal unit includes a battery pack and battery power management functions having a control for placing the personal unit in a "Receive Only" mode after transmitting the RF emergency signal and receiving back the acknowledgment signal from the nearby entity.

2. A personal emergency location system according to claim 1, further comprising the nearby entity as a base station having a GPS system for receiving GPS satellite signals and updated almanac and ephemeris data, an RF transceiver for receiving an RF emergency signal with determined GPS location coordinates from the personal unit, a computer for computing the person's position on the basis of the determined GPS location coordinates from the personal unit and the updated GPS data received by its GPS system, and emergency alert means for sending an RF broadcast signal of the person's position over a long transmission range.

3. A personal emergency location system according to claim 2, as used for rescue of a person falling overboard from a vessel, wherein the personal unit is worn by the person overboard, and the base station is installed on the person's vessel or other nearby vessel.

4. A personal emergency location system according to claim 1, wherein the personal unit includes a GPS processor paired with the GPS receiver for calculating GPS location coordinates from the received GPS satellite signals.

5. A personal emergency location system according to claim 1, wherein the battery pack and battery power management functions have a control for activating the GPS receiver and RF transmitter only after receiving an activation signal from a sensor detecting an emergency condition or upon manual activation.

6. A personal emergency location system comprising: a small, personal unit adapted to be worn by a person and having a GPS antenna for reception of GPS satellite signals, a GPS receiver for handling the GPS satellite signals, a GPS processor for determining GPS location coordinates from the received GPS satellite signals, an RF transmitter for generating an RF emergency signal with the determined GPS location coordinates, and an RF antenna for transmitting the RF emergency signal generated by the RF transmitter within a predetermined short range to any nearby entity having an RF transceiver, wherein the personal unit has a balloon fillable with lighter-than-air gas attached to a distal end of a tether attached to the personal unit, and the GPS and RF antennae are attached to the tether and to the balloon, such that when the balloon is filled with the lighter-than-air gas upon deployment during an emergency condition, the GPS and RF antennae are held aloft from the person for proper functioning in receiving GPS satellite signals and sending RF emergency signals.

7. A personal emergency location system according to claim 6, wherein the antennae are carried within a plastic sleeve attached to the tether and the antennae have ends carried on the inside of the balloon.

8. A personal emergency location system according to claim 6, wherein the balloon is dyed a fluorescent color to serve as a visual marker to rescue personnel.

9. A personal emergency location system comprising: a small, personal unit adapted to be worn by a person and having a GPS antenna for reception of GPS satellite signals, a GPS receiver for handling the GPS satellite signals, a GPS processor for determining GPS location coordinates from the received GPS satellite signals, an RF transmitter for generating an RF emergency signal with the determined GPS location coordinates, and an RF antenna for transmitting the RF emergency signal generated by the RF transmitter within a predetermined short range to any nearby entity having an RF transceiver, wherein the nearby entity is a base station having a GPS system for receiving GPS satellite signals and updated almanac and ephemeris data, an RF transceiver for receiving an RF emergency signal with determined GPS location coordinates from the personal unit, a computer for computing the person's position on the basis of the determined GPS location coordinates from the personal unit and the updated GPS data received by its GPS system, and emergency alert means for sending an RF broadcast signal of the person's position over a long transmission range, wherein the personal unit and the base station have interconnection means for transmitting updated GPS data from the base station to the personal unit so that the personal unit can be updated with the updated GPS data.

10. A personal emergency location system according to claim 9, wherein the interconnection means comprises an individual recharge module connected to the base station to which the personal unit is connected during inactive periods.

11. A personal emergency location system according to claim 9, wherein the personal unit is assigned an individual ID code recognized by the base station, and the individual ID code is transmitted with the RF emergency signal to identify the personal unit sending the RF emergency signal to the base station.

12. A personal emergency location system according to claim 9, as used for rescue of a person falling overboard from a vessel, wherein the personal unit is worn by the person overboard, and the base station is installed on the person's vessel.

13. A personal emergency location system according to claim 9, wherein the personal unit includes antenna deployment means for deploying its GPS and RF antennae above the water.

14. A personal emergency location system according to claim 9, wherein the personal unit includes a battery pack and battery power management functions having a control for placing the personal unit in a "Receive Only" mode after transmitting the RF emergency signal and receiving back an acknowledgment signal from the base station.

15. A method of locating a person in distress comprising the steps of:

providing a small, personal GPS unit to be worn by the person having a battery pack with battery power management control and a GPS transmitter/receiver unit powered by the battery pack for determining GPS location coordinates of the person's position based upon received GPS satellite signals and transmitting an RF emergency signal including the GPS location coordinates over a predetermined short range;

activating the personal GPS unit when the person is in an emergency condition such that the battery pack powers the transmitting of the RF emergency signal with the person's GPS location coordinates;

receiving the RF emergency signal with the person's GPS location coordinates from the personal GPS unit at a nearby rescue entity equipped with an RF transceiver, and sending an acknowledgment signal back to the personal unit;

using the battery power management control to place the personal GPS unit in a Receive-Only mode when the acknowledgment signal is received by the personal GPS unit, in order to conserve battery power in the battery pack; and activating the personal GPS unit again from the Receive-Only mode to transmit another RF emergency signal when a location update request signal is received or upon manual activation of the personal GPS unit.

16. A method of locating a person in distress according to claim 15, further comprising assigning an individual ID code to the personal GPS and sending the individual ID code with the RF emergency signal transmitted from the unit in order to identify the personal GPS unit.

17. A method of locating a person in distress comprising the steps of:

providing a small, personal unit to be worn by the person having a GPS antenna for receiving GPS satellite signals, a GPS receiver for handling the GPS satellite signals, a GPS processor for determining GPS location coordinates the received GPS satellite signals, an RF transmitter for generating an RF emergency signal with the determined GPS location coordinates, and an RF antenna for transmitting the RF emergency signal generated by the RF transmitter within a predetermined short range;

activating the personal unit when the person is in an emergency condition, and transmitting the RF emergency signal with the determined GPS location coordinates generated by the RF transmitter;

receiving the RF emergency signal with the determined GPS location coordinates at a nearby entity equipped with an RF transceiver, and sending an RF broadcast signal of the person's position based on the determined GPS location coordinates over a long transmission range, wherein the transmitting step includes continuing to send the RF emergency signal at increasingly longer time intervals until an acknowledgment signal is received by the personal unit, and thereupon placing the personal unit in a Receive-Only mode.

18. A method of locating a lost person according to claim 17, wherein the personal unit is re-activated from the Receive-Only mode when an update request signal is received or by manual activation.

19. A method of locating a lost person according to claim 17, wherein the personal unit sends and receives emergency communication signals according to specifications for GMDSS/DSC radio communications.

20. A method of locating a lost person according to claim 17, used for a person lost overboard from a vessel, wherein the receiving step includes equipping the vessel with a GPS system for receiving updated GPS data and updating the personal unit while the person is on-board the vessel, and with an RF transceiver for receiving the RF emergency signal from the personal unit when the person has fallen overboard and sending the RF broadcast signal of the person's position.

* * * * *